(12) United States Patent
Recker

(10) Patent No.: US 10,257,626 B2
(45) Date of Patent: Apr. 9, 2019

(54) FITTER DEFINED USER CONTROLLED ADAPTATION TOOL FOR A HEARING ASSISTANCE DEVICE

(71) Applicant: Starkey Laboratories, Inc., Eden Prairie, MN (US)

(72) Inventor: Karrie LaRae Recker, Edina, MN (US)

(73) Assignee: Starkey Laboratories, Inc., Eden Prairie, MN (US)

( * ) Notice: Subject to any disclaimer, the term of this patent is extended or adjusted under 35 U.S.C. 154(b) by 409 days.

(21) Appl. No.: 14/677,291

(22) Filed: Apr. 2, 2015

(65) Prior Publication Data

US 2016/0066107 A1   Mar. 3, 2016

Related U.S. Application Data

(60) Provisional application No. 61/975,527, filed on Apr. 4, 2014.

(51) Int. Cl.
    *A63F 13/54*   (2014.01)
    *H04R 25/00*   (2006.01)
    *G06F 3/16*    (2006.01)

(52) U.S. Cl.
    CPC .......... *H04R 25/558* (2013.01); *A63F 13/54* (2014.09); *G06F 3/162* (2013.01); *H04R 25/505* (2013.01); *H04R 25/554* (2013.01); *H04R 25/70* (2013.01); *H04R 2225/39* (2013.01); *H04R 2225/55* (2013.01)

(58) Field of Classification Search
    None
    See application file for complete search history.

(56) References Cited

U.S. PATENT DOCUMENTS

| 6,829,363 | B2 | 12/2004 | Sacha et al. |
| 7,206,424 | B2 | 4/2007 | Sacha |

(Continued)

FOREIGN PATENT DOCUMENTS

| EP | 2201793 B1 | 3/2011 |
| KR | 20130029562 A | 3/2013 |

(Continued)

OTHER PUBLICATIONS

"International Application Serial No. PCT/US2015/024053, International Search Report dated Jul. 21, 2015", 3 pgs.

(Continued)

*Primary Examiner* — Jason T Yen
(74) *Attorney, Agent, or Firm* — Schwegman Lundberg & Woessner, P.A.

(57) ABSTRACT

Disclosed herein, among other things, are systems and methods for fitting hearing assistance devices. One aspect of the present subject matter includes a method for assisting wearers in adjusting settings of hearing assistance devices using a mobile adaptation tool. The method includes providing a mobile adaptation tool for a wearer of a hearing assistance device. The wearer is guided using gamification to adjust settings of the hearing assistance device using the mobile adaptation tool, including providing an update to the wearer via the adaptation tool with an indication of a level of matching between current settings and target settings, according to various embodiments.

20 Claims, 3 Drawing Sheets

(56) References Cited

U.S. PATENT DOCUMENTS

| | | | |
|---|---|---|---|
| 7,869,606 B2 | 1/2011 | Fichtl et al. | |
| 8,032,079 B2 | 10/2011 | Schneider et al. | |
| 8,077,889 B2 | 12/2011 | Bächler et al. | |
| 8,385,571 B2 | 2/2013 | Barthel et al. | |
| 2005/0036637 A1 | 2/2005 | Janssen | |
| 2009/0191946 A1* | 7/2009 | Thomas | G07F 17/32 463/20 |
| 2010/0119093 A1* | 5/2010 | Uzuanis | H04R 25/70 381/312 |
| 2010/0131858 A1* | 5/2010 | Schultz | H04M 1/72519 715/751 |
| 2010/0296679 A1 | 11/2010 | Hofmann | |
| 2010/0303269 A1 | 12/2010 | Baechler | |
| 2010/0324427 A1* | 12/2010 | Devot | A61B 5/0205 600/484 |
| 2011/0249839 A1 | 10/2011 | Mindlin et al. | |
| 2011/0280409 A1 | 11/2011 | Michael et al. | |
| 2012/0243693 A1 | 9/2012 | Paludan-Muller et al. | |
| 2012/0269369 A1* | 10/2012 | Yanz | H04R 25/70 381/314 |
| 2013/0114836 A1 | 5/2013 | Fichtl et al. | |
| 2014/0064528 A1* | 3/2014 | Flood | H04R 25/554 381/315 |
| 2015/0023512 A1* | 1/2015 | Shennib | H04R 25/70 381/60 |

FOREIGN PATENT DOCUMENTS

| | | |
|---|---|---|
| WO | WO-2009144056 A1 | 12/2009 |
| WO | WO-2013068051 A1 | 5/2013 |
| WO | WO-2015153867 A1 | 10/2015 |

OTHER PUBLICATIONS

"International Application Serial No. PCT/US2015/024053, Written Opinion dated Jul. 21, 2015", 6 pgs.

Dreschler, W., et al., "Client-Based Adjustments of Hearing Aid Gain: The Effect of Different Control Configurations", Ear & Hearing; 29, (2008), 214-227.

Keidser, G., et al., "Real-life efficacy and reliability of training a hearing aid", Ear & Hearing 34(5), (2013), 619-629.

Keidser, G., et al., "Variation in preferred gain with experience for hearing-aid users", International Jounral of Audiology; 47:10, (Jul. 7, 2009), 621-635.

Mueller, H.G., et al., "Using trainable hearing aids to exmine real-world preferred gain", Journal of the American Academy of Audiology 19, (2008), 16 pgs.

Palmer, C., "Siemens expert series: Implementing a gain learning feature.", [Online]. Retrieved from the Internet: <URL: http://www.audiologyonline.com/articles/siemens-expert-series-implementing-gain-11244, (2012), 5 pgs.

Valentine, S., et al., "Practice management: Evidence for the use of a new patient-centered fitting tool", Hearing Review 18(4), (2011), 7 pgs.

Zakis, J., et al., "The Design and Evaluation of a Hearing Aid with Trainable Amplification Parameters", Ear & Hearing; 28, (2007), 812-830.

"European Application Serial No. 15720822.4, Response filed Apr. 15, 2017 to Office Action dated Nov. 16, 2016", 13 pgs.

"International Application Serial No. PCT/US2015/024053, International Preliminary Report on Patentability dated Oct. 13, 2016", 8 pgs.

\* cited by examiner

FITTER DEFINED USER CONTROLLED ADAPTATION TOOL FOR A HEARING ASSISTANCE DEVICE

CLAIM OF PRIORITY AND INCORPORATION BY REFERENCE

The present application claims the benefit under 35 U.S.C. § 119(e) of U.S. Provisional Patent Application 61/975,527, filed Apr. 4, 2014, the disclosure of which is hereby incorporated by reference herein in its entirety.

TECHNICAL FIELD

This document relates generally to hearing assistance systems and more particularly to systems and methods using an adaptation tool for fitting a hearing assistance device.

BACKGROUND

Modern hearing assistance devices, such as hearing aids, are electronic instruments worn in or around the ear that compensate for hearing losses of hearing-impaired people by specially amplifying sound. Hearing aids typically include a housing or shell with internal components such as a signal processor, a microphone and a receiver housed in a receiver case. Hearing assistance devices are usually fitted for a wearer or user using a fitting system including a computing system executing fitting software. Fitting software is an application which runs on the computing system and is typically utilized by an audiologist or fitter to set various parameters of the hearing assistance devices in order to customize the device to the wearer's needs. Examples include adjusting the amplification levels for particular frequencies, setting up accessories to work properly with the hearing assistance devices, and the like. However, fitting systems do not accommodate for wearers of various experience levels with hearing assistance devices, and do not adequately assist wearers in making further adjustments to their devices.

Accordingly, there is a need in the art for improved systems and methods for fitting hearing assistance devices.

SUMMARY

Disclosed herein, among other things, are systems and methods for fitting hearing assistance devices. One aspect of the present subject matter includes a method for assisting wearers in adjusting settings of hearing assistance devices using a mobile adaptation tool. The method includes providing a mobile adaptation tool for a wearer of a hearing assistance device. The wearer is guided using gamification to adjust settings of the hearing assistance device using a processor of the mobile adaptation tool, including providing an update to the wearer via the adaptation tool with an indication of a level of matching between current settings and target settings, according to various embodiments.

One aspect of the present subject matter relates to a system for fitting hearing assistance devices. The system includes a hearing assistance device configured to be worn by a wearer and further configured to compensate for hearing losses of the wearer, and a mobile adaptation tool for the wearer. The mobile adapted tool includes a processor configured to use gamification to guide the wearer to adjust settings of the hearing assistance device using the mobile adaptation tool, including providing an update to the wearer via the adaptation tool with an indication of a level of matching between current settings and target settings, in various embodiments.

This Summary is an overview of some of the teachings of the present application and not intended to be an exclusive or exhaustive treatment of the present subject matter. Further details about the present subject matter are found in the detailed description and appended claims. The scope of the present invention is defined by the appended claims and their legal equivalents.

DETAILED DESCRIPTION

Figure 1A:
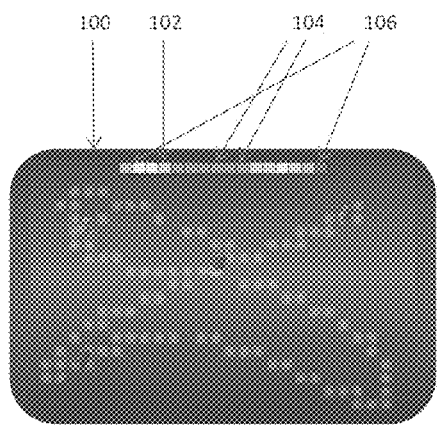
FIGS. 1A-1D illustrate examples of graphic user interfaces of an adaptation tool for fitting a hearing assistance device, according to various embodiments of the present subject matter.

The following detailed description of the present subject matter refers to subject matter in the accompanying drawings which show, by way of illustration, specific aspects and embodiments in which the present subject matter may be practiced. These embodiments are described in sufficient detail to enable those skilled in the art to practice the present subject matter. References to "an", "one", or "various" embodiments in this disclosure are not necessarily to the same embodiment, and such references contemplate more than one embodiment. The following detailed description is demonstrative and not to be taken in a limiting sense. The scope of the present subject matter is defined by the appended claims, along with the full scope of legal equivalents to which such claims are entitled.

The present detailed description will discuss hearing assistance devices using the example of hearing aids. Hearing aids are only one type of hearing assistance device. Other hearing assistance devices include, but are not limited to, those in this document. It is understood that their use in the description is intended to demonstrate the present subject matter, but not in a limited or exclusive or exhaustive sense.

Hearing assistance devices are usually fitted for a wearer or user using a fitting system including a computing system executing fitting software. Fitting software is an application which runs on the computing system and is typically utilized by an audiologist or fitter to set various parameters of the hearing assistance devices in order to customize the device to the wearer's needs. Examples include adjusting the amplification levels for particular frequencies, setting up accessories to work properly with the hearing assistance devices, and the like. However, fitting systems do not accommodate for wearers of various experience levels with hearing assistance devices, and do not adequately assist wearers in making further adjustments to their devices.

It has been shown that new users (wearers) of hearing aids, especially those who have a four-frequency pure-tone average of 43 dB HL or higher, need less gain in their hearing aids than individuals who have previous experience with hearing aids. Because of this, new hearing aid wearers are often given less gain in their hearing aids during the initial hearing aid fitting. Reduced gain means that new hearing aid wearers may find the loudness of the hearing aids more acceptable. However, they may not be achieving the maximum amount of speech intelligibility that they could achieve if they had higher amounts of gain in their hearing aids. Previous attempts to solve this problem include using experience managers in fitting software, to allow the fitter (usually an audiologist or other professional) to select offsets from fitting targets based on an amount of experience a wearer has with the hearing aids. However, there are multiple disadvantages of using a manual experience manager. First, it assumes that the hearing aid wearer takes the time to come in for the follow-up appointments. Second, it assumes that the hearing aid fitter remembers to advance the patient's hearing aid settings to the next level at those appointments. Another disadvantage of experience managers is that they do not involve the hearing aid wearer's preferences in the process. Another previous attempt at a solution included self-learning algorithms allowing wearer input. However, a major disadvantage of self-learning algorithms is that they do not guide the wearer to one or more targets, which could lead to sub-optimal results.

Disclosed herein, among other things, are systems and methods for fitting hearing assistance devices. One aspect of the present subject matter includes a method for assisting wearers in adjusting settings of hearing assistance devices using a mobile adaptation tool. The method includes providing a mobile adaptation tool for a wearer of a hearing assistance device. The wearer is guided using gamification to adjust settings of the hearing assistance device using the mobile adaptation tool, including providing an update to the wearer via the adaptation tool with an indication of a level of matching between current settings and target settings, according to various embodiments.

In various embodiments, the present subject matter uses a gamification approach to get the hearing aid wearers to optimize the hearing aid settings by themselves in a given environment. "Gamification" is defined by Wikipedia as "the use of game thinking and game mechanics in non-game contexts to engage users in solving problems. Gamification is used in applications and processes to improve user engagement, return on investment, data quality, timeliness, and learning." In one embodiment, the present subject matter uses gamification by allowing the hearing aid fitter to choose two sets of gain settings for each patient (or wearer): the initial set of gain settings (whichever settings she believes will help the hearing aid wearer achieve initial acceptance of the hearing aids); and target gain settings (the settings that she would like for the patient to have in his hearing aids after some adjustment period). The wearer is then provided with an adaptation or fitting tool to make further adjustments. In various embodiments, the adaptation or fitting tool is provided to the wearer on an advanced remote control or as an application on a mobile device, such as a smart phone. The fitting/adaptation tool shows the hearing aid wearer how his hearing aids are set compared to the target settings, in various embodiments. The hearing aid wearer can then be allowed to make adjustments to the gain/compression settings as desired; however, he would be encouraged to make changes that move his hearing aid settings closer to the target settings using gamification, in various embodiments.

One way to encourage the hearing aid wearer to reach the fitting targets is to use a visual indicator to reaffirm that the individual is doing the correct thing by moving his hearing aid settings closer to the fitting targets. As a few examples, this can take the form of color coding (for example an icon on the screen turns green), a picture of a face that turns to a smiley face, or stars that appear on the screen when a close match to the targets is achieved. Text or audio reinforcement could be used, in various embodiments. For example, when the hearing aid settings are adjusted so that they are close to the fitting targets, the hearing aid wearer could receive a message such as, "You have made a significant improvement in your hearing aid settings, you should now notice improved hearing in this environment!"

In various embodiments, the hearing aid wearer could receive "points" for wearing his hearing aids, for making adjustments to his hearing aids and for reaching certain goals. The points can be virtual (i.e. just for fun) or could be redeemed for tangible items at the hearing aid fitter's office (e.g. free batteries) or from the hearing aid manufacturer (e.g. the opportunity to download a free app or a trial period with a new algorithm), in various embodiments. Providing an incentive encourages the hearing aid wearer to make multiple adjustments to his hearing aids over time.

In an embodiment, the hearing aid wearer could be given the final targets as a goal right away. In another embodiment, the wearer could be given targets that move him or her incrementally toward the end goal. For example, if the long-term goal is for the hearing aid wearer to increase his gain by X dB at some frequency, "X" can be divided by some number (e.g. 2, 3 or 4, etc.), and the hearing aid wearer can be given targets that are that are ½ (⅓, ¼, etc.) of the way between his current settings and the final target settings. Once the settings in the hearing aids have reached the first set of targets, the next set of targets could be displayed, in an embodiment. To minimize the likelihood that the hearing aid wearer could set the gains in his hearing aids too high or too low, the hearing aid fitter can restrict the range of adjustments (e.g. such that the wearer can not increase or decrease the gain of the hearing aids by more than x dB at a given frequency/input level). In various embodiments, adjustments to the hearing aids would occur through wireless communication between the hearing aids and the adaptation tool, such as advanced remote control or smart phone. The present subject matter provides a method of incorporating the patient's own real-ear acoustics into the estimation of the match to the fitting targets, in an embodiment.

By using a gamification approach, in which the hearing aid wearer is given a tool to adjust his hearing aid settings and an incentive to reach the fitting targets on his own, the present subject matter takes into consideration both the hearing aid wearer's preferences and the hearing aid fitter's recommendations. This approach is self-paced, which ensures that the settings will not change too quickly or too slowly for a given individual, in an embodiment. Additionally, the present subject matter allows the hearing aid wearer to interact with his hearing aids in a fun, high-tech, manner that increases his sense of ownership over the fitting process and keeps him engaged in the training process for a longer period of time than if he were not given feedback and/or incentives to reach certain goals. Finally, because the settings are not adapting automatically over time in an embodiment, the present subject matter permits the hearing aid wearer to retain control over the hearing aid settings at all times (i.e. the hearing aids would not make adjustments to the settings behind-the-scenes without his knowledge or input). In various embodiments, because the hearing aid fitter can choose the target gain and compression settings for the hearing aid wearer and can restrict the range of adjustments, she can be assured that the settings that the patient chooses will be within the range of settings that she considers acceptable for his hearing loss. Another advantage of the present subject matter is that, because the hearing aid wearer retains control over the actual settings in his hearing aids, he is likely to end up with settings that are acceptable to him. Multiple studies have shown that people who use trainable hearing aids often prefer their trained settings over either target-matched settings or audiologist-adjusted settings. A further advantage of the present subject matter is that, because the hearing aid wearer is in control of the hearing aid settings, it will eliminate the need for him to make multiple trips to the hearing aid fitter's office for adjustments. In addition, because the present subject matter provides a self-paced method, it ensures that the gains/compression will be adjusted at a speed that is acceptable to the hearing aid wearer. Also, giving the hearing aid wearer a fun and high-tech "game" that allows him to adjust his hearing aids, provides him with feedback regarding how well his hearing aids are matching a target, and provides him with incentives to train his hearing aids and meet certain goals, encourages him to reach target settings, and gives him an increased sense of ownership over the fitting process.

The present subject matter provides visual feedback on the adaptation tool that is simplified for the target audience of hearing aid wearers. Various graphical user interfaces (GUI) can be used on the adaptation tool by the present subject matter, including a table-like interface, equalizers (EQ) or a list of presets from which the hearing aid wearer can choose. Each of these options can use color-coding, numbers, pictures, text or audio to indicate the degree to which the current hearing aid settings matched the fitting targets either globally or in specific frequency regions, in various embodiments. The visual indicator updates as the hearing aid wearer made real-time adjustments to the hearing aid settings, in an embodiment.

Figure 1B:
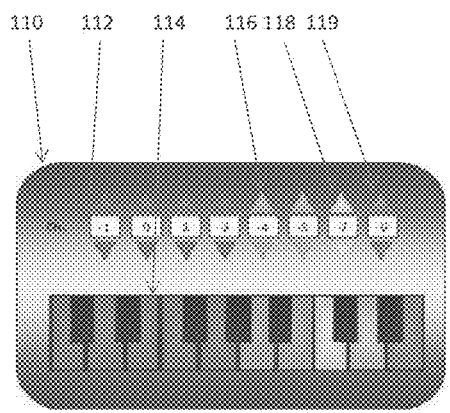
Figure 1C:
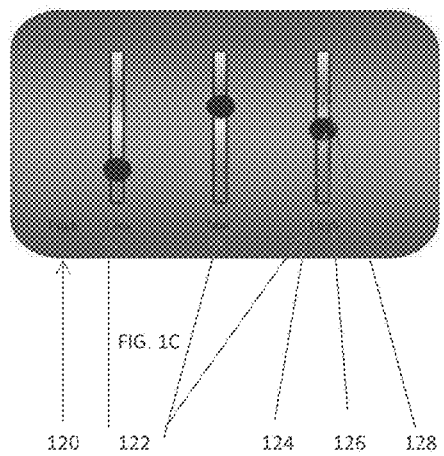
Figure 1D:
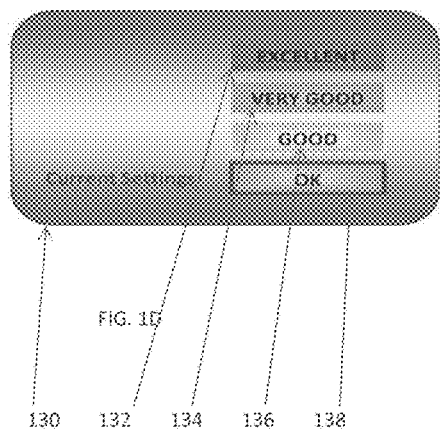

FIGS. 1A-1D illustrate examples of graphic user interfaces (100, 110, 120, 130) of an adaptation tool for fitting a hearing assistance device, according to various embodiments of the present subject matter. In FIG. 1A, an interface 100 displays a bar 102 across the top of the screen representing different frequency channels 104, for example 16 different channels as shown. A color code can be used, such as: green=a good match 104, yellow=an okay match 102, red=a poor match 106. In this example, there is a poor match to the fitting targets in the low and the high frequencies 104 and a good match to the fitting targets in the mid frequencies 106. In FIG. 1B, a table interface 110 with 8 adjustable frequency regions 112 is provided. Other numbers of regions can be used without departing from the scope of the present subject matter. The numbers in the boxes and the color coding of the arrows (above and below the boxes, green=close to target 112, light green=further from target 116, yellow=still further from target 118, and red=furthest from target 119) indicate how far the gain in each channel is above or below the fitting targets, in an embodiment. Piano keys 114 are shown to indicate whether the channels correspond to low, mid or high frequencies, in an embodiment. In FIG. 1C, an equalizer interface 120 with sliders 122 for three different frequency regions (low, mid and high) is provided. Other numbers of regions can be used without departing from the scope of the present subject matter. The color-coding on the sliders indicates how close the current gain settings (represented by the black circles 126) are to the desired gain settings (the green portion 128 of the sliders indicates the desired settings), in an embodiment. Red 124 is furthest from the desired settings, and yellow (between red and green, covered by black circle 126) is closer to the desired settings, which are green 128 in the depicted embodiment. Although a graphic EQ is shown in FIG. 1C, semi-parametric or parametric EQs (which offer control over the frequency and/or bandwidth of the signal that is being manipulated) can also be used, in various embodiments. In FIG. 1D, an embodiment includes an interface 130 for the adaptation tool with four different presets (132, 134, 136, 138) ranging from an "OK" match to the fitting targets to an "EXCELLENT" match to the fitting targets. Additional presets can be used, in various embodiments. Color coding can also be used, in an embodiment. The depicted embodiment shows green 132 for excellent, light green 134 for very good, yellow 136 for good, and orange 138 for okay.

Figure 2A:
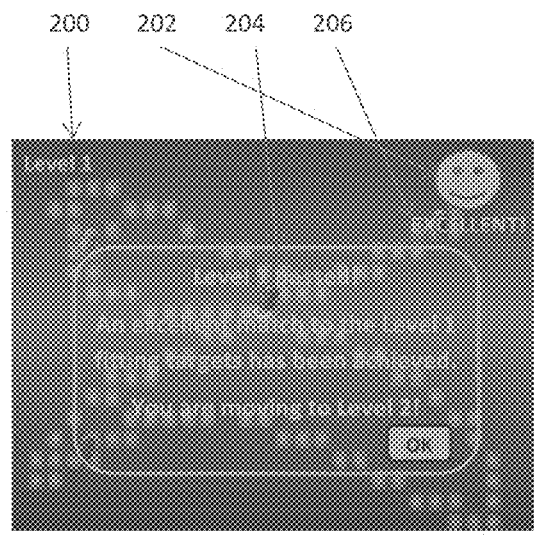
FIGS. 2A-2B illustrate examples of graphic user interfaces of an adaptation tool for fitting a hearing assistance device, according to various embodiments of the present subject matter.
Figure 2B:
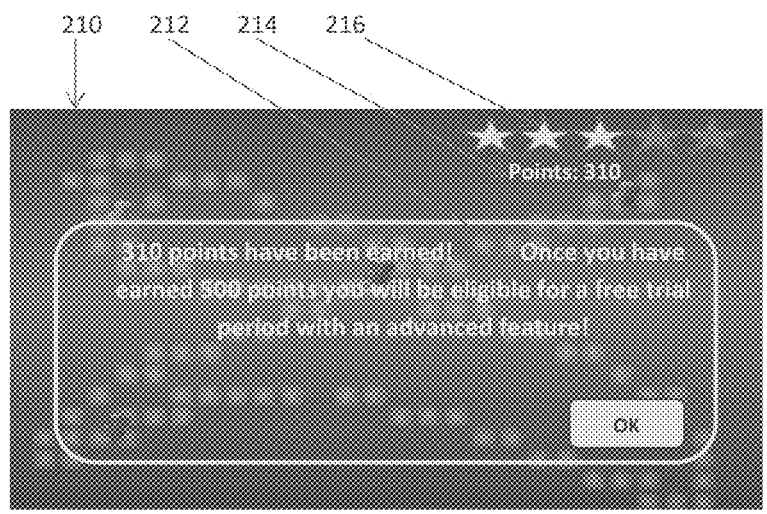

In addition to visual feedback regarding the quality of his hearing aid fitting, the hearing aid wearer can also receive verbal (text or audio) encouragement via the adaptation tool, including but not limited to: progress updates, points or other incentives to continue using the tool, such as shown in FIGS. 2A and 2B. While these examples are shown using an interface such as the one found in FIG. 1A, the same types of feedback and rewards could be used with any of the interfaces shown in FIGS. 1A-1D, or other interfaces for the adaptation tool.

FIGS. 2A-2B illustrate examples of graphic user interfaces (200, 210) of an adaptation tool for fitting a hearing assistance device, according to various embodiments of the present subject matter. These include GUIs including progress updates, positive feedback and "rewards" for user participation and achievement, in various embodiments. In FIG. 2B, stars 216 are shown indicating how well the current settings match the target settings. In this example, 3 of 5 stars have been achieved representing an "OK" match to the fitting targets. "Points" 214 are also shown indicating how many points the hearing aid wearer has earned for using the application and for reaching certain goals. At various intervals, the hearing aid wearer can receive messages 212 letting him know how close he is to receiving "bonus" items, in an embodiment. In FIG. 2A, a face 202 on the screen indicates the degree to which the current settings match the fitting targets. In this example, the face is happy and green, representing an excellent match to the fitting targets. "Text" reinforcement 206 is also given (EXCELLENT!) along with a message 204 that the current target settings have been matched and the hearing aid wearer will now be given higher (Level 2) targets.

In various embodiments, the present subject matter includes a GUI on the adaptation tool including an option to store each new set of gain/compression settings that the hearing aid wearer creates. In further embodiments, the GUI can also include: an option to label these settings; an option for the hearing aid wearer to revert to previous hearing aid settings; and/or an option for the new settings to become the "baseline" for future adjustments to the hearing aid settings. In various embodiments, the hearing aid wearer is able to adjust the gain and compression settings for a right/left pair of hearing aids together or independently. In further embodiments, in addition to the GUI options presented above, any of the following options can be used to indicate how close the hearing aid settings are to the fitting targets: a percentage of channels within x dB of the fitting targets; an estimate of the speech intelligibility (e.g. Articulation Index (AI), Speech Intelligibility Index (SII), estimated percent correct word understanding, etc.) for the current settings, the target settings and any intermediate settings; and/or a method of indicating whether the gain settings are above or below the fitting targets (i.e. the hearing aid wearer should be given both an estimate of how much his current gain settings are off and the direction in which they are off). As an example, if a color-coded bar is used as a visual indicator, a box around a given color segment on the adaptation tools GUI can be in bold if the hearing aid settings are above the fitting targets.

In various embodiments, the present subject matter provides an expert mode that includes any or all of the following: a method for the hearing aid fitter to view the gain/compression settings (initial, current, target or saved settings) in the standard frequency-response-curve format or as a table of values, and these values can be displayed as simulated real-ear SPL or insertion gain, in dB; a method for the hearing aid fitter to transfer these values to a computer; a method for data logging that shows when new gain/compressions settings were programmed into the hearing aids (date and time), the new gain/compression values (displayed as simulated real-ear SPL or insertion gain, in dB); and an estimate of the level and signal-to-noise ratio of the environment in which the settings were created; and an estimate of when the hearing aid wearer should reach the target settings (based on how often he uses the application and how big the changes have been that he has made to his devices). If the hearing aid wearer is not expected to reach the fitting targets, an estimate of when he will reach his final desired settings can be provided, in an embodiment. In various embodiments, different target settings can be used for different environments. The initial and final fitting settings can be based on targets from a standard fitting formula (e.g. NAL-NL2, DSL i/o), a proprietary fitting formula from a hearing aid (or other) manufacturer, defined by the hearing aid fitter or offsets to any of these examples in various embodiments. According to various embodiments, the current hearing aid settings (e.g. simulated real-ear SPL) can be estimated using average ear acoustics or using the patient's own ear acoustics (e.g. by incorporating a real-ear-to-coupler difference (RECD)). Alternatively, the current hearing aid settings can be measured in real time by having a microphone in the canal portion of the hearing aid. In various embodiments, the estimated match to fitting targets could be based on one input level or multiple input levels. The present subject matter can be used to help hearing-impaired individuals adapt to any other hearing aid feature (e.g. noise reduction, directionality, spectral enhancement, frequency transposition/compression, etc.), in various embodiments.

According to various embodiments, the present subject matter takes into consideration both the hearing aid wearer's preferences and the hearing aid fitter's recommendations. It actively involves the hearing aid wearer in the fitting process while giving the hearing aid fitter control over the range of settings that are available to the end user. Thus, this offers a solution that does not rely on the hearing aid fitter to follow through with manual adjustments to an experience manager at follow-up visits. Because the gain/compression adjustments do not occur automatically over time, there is less risk that the hearing aid wearer will end up with settings that he does not like. In turn, this leads to less wasted time in travel and appointments for both the hearing aid fitter and the hearing aid wearer. In addition, data collected from using the adaptation tool of the present subject matter can be used to inform (or make improvements to) an automatic experience manager.

Figure 3:
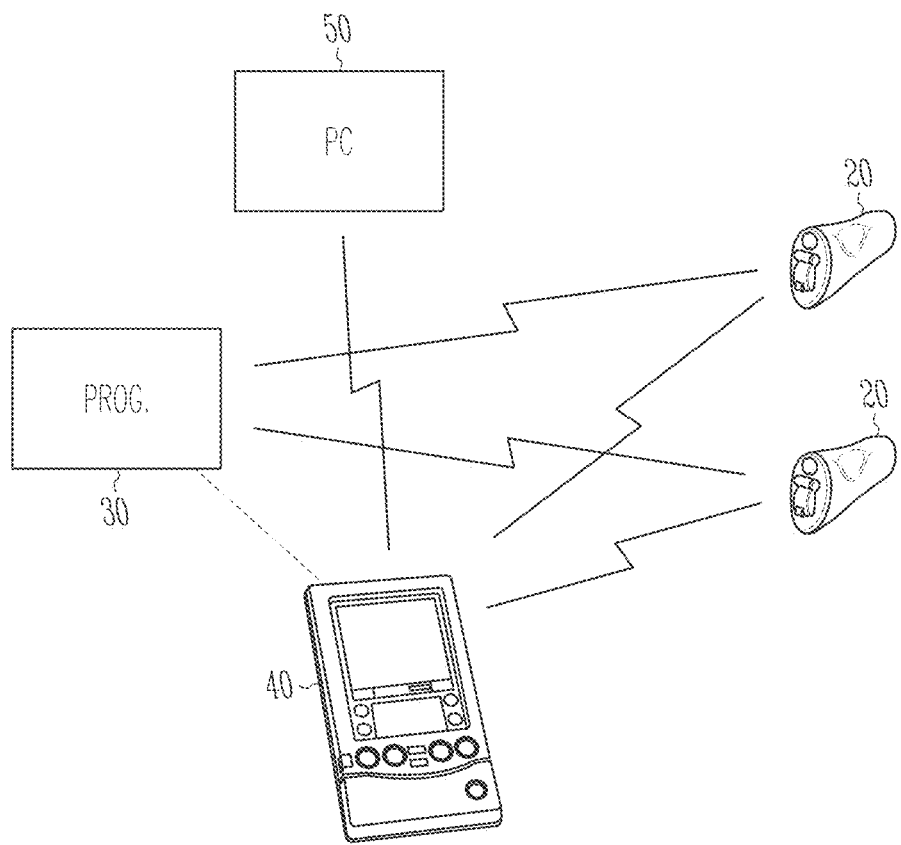
FIG. 3 illustrates a block diagram of a system for fitting hearing assistance devices including an adaptation tool for a wearer, according to various embodiments of the present subject matter.

FIG. 3 illustrates a block diagram of a system for fitting hearing assistance devices 20 including an adaptation tool 40 for a wearer, according to various embodiments of the present subject matter. A wireless hearing assistance device programmer 30 configured to wirelessly communicate with a hearing assistance device 20 using at least one of a plurality of channels. The system may also include a host computer, such as PC 50, in communication with the wireless programmer. The PC 50 may be wired or wirelessly connected to the programmer 30, either directly or indirectly, in various embodiments. The wireless programmer 30 is configured to assist a user, such as an audiologist or other professional, in fitting the hearing assistance devices 20 for a wearer of the devices. According to various embodiments, the wearer is guided using gamification to adjust settings of the hearing assistance device(s) 20 using the adaptation tool 40, including providing an update to the wearer via the adaptation tool with an indication of a level of matching between current settings and target settings, according to various embodiments. The adaptation tool 40 is configured to communicate wired or wirelessly with the devices 20, the programmer 30, and/or the PC 50. In various embodiments, the adaptation tool includes a stand alone remote control. In various embodiments, the adaptation tool includes a mobile device, such as a smart phone, tablet or laptop, with an application running on the mobile device to provide the adaptation function discussed herein. Other types of adaptation tools can be used without departing from the scope of the present subject matter.

Various embodiments of the present subject matter support wireless communications with a hearing assistance device. In various embodiments the wireless communications can include standard or nonstandard communications. Some examples of standard wireless communications include link protocols including, but not limited to, Bluetooth™, IEEE 802.11 (wireless LANs), 802.15 (WPANs), 802.16 (WiMAX), cellular protocols including, but not limited to CDMA and GSM, ZigBee, and ultra-wideband (UWB) technologies. Such protocols support radio frequency communications and some support infrared communications. Although the present system is demonstrated as a radio system, it is possible that other forms of wireless communications can be used such as ultrasonic, optical, and others. It is understood that the standards which can be used include past and present standards. It is also contemplated that future versions of these standards and new future standards may be employed without departing from the scope of the present subject matter.

The wireless communications support a connection from other devices. Such connections include, but are not limited to, one or more mono or stereo connections or digital connections having link protocols including, but not limited to 802.3 (Ethernet), 802.4, 802.5, USB, ATM, Fibre-channel, Firewire or 1394, InfiniBand, or a native streaming interface. In various embodiments, such connections include all past and present link protocols. It is also contemplated that future versions of these protocols and new future standards may be employed without departing from the scope of the present subject matter.

It is understood that variations in communications protocols, antenna configurations, and combinations of components may be employed without departing from the scope of the present subject matter. Hearing assistance devices typically include an enclosure or housing, a microphone, hearing assistance device electronics including processing electronics, and a speaker or receiver. It is understood that in various embodiments the microphone is optional. It is understood that in various embodiments the receiver is optional. Antenna configurations may vary and may be included within an enclosure for the electronics or be external to an enclosure for the electronics. Thus, the examples set forth herein are intended to be demonstrative and not a limiting or exhaustive depiction of variations.

It is further understood that any hearing assistance device may be used without departing from the scope and the devices depicted in the figures are intended to demonstrate the subject matter, but not in a limited, exhaustive, or exclusive sense. It is also understood that the present subject matter can be used with a device designed for use in the right ear or the left ear or both ears of the user.

It is understood that the hearing aids referenced in this patent application include a processor. The processor may be a digital signal processor (DSP), microprocessor, microcontroller, other digital logic, or combinations thereof. The processing of signals referenced in this application can be performed using the processor. Processing may be done in the digital domain, the analog domain, or combinations thereof. Processing may be done using subband processing techniques. Processing may be done with frequency domain or time domain approaches. Some processing may involve both frequency and time domain aspects. For brevity, in some examples drawings may omit certain blocks that perform frequency synthesis, frequency analysis, analog-to-digital conversion, digital-to-analog conversion, amplification, audio decoding, and certain types of filtering and processing. In various embodiments the processor is adapted to perform instructions stored in memory which may or may not be explicitly shown. Various types of memory may be used, including volatile and nonvolatile forms of memory. In various embodiments, instructions are performed by the processor to perform a number of signal processing tasks. In such embodiments, analog components are in communication with the processor to perform signal tasks, such as microphone reception, or receiver sound embodiments (i.e., in applications where such transducers are used). In various embodiments, different realizations of the block diagrams, circuits, and processes set forth herein may occur without departing from the scope of the present subject matter.

The present subject matter is demonstrated for hearing assistance devices, including hearing aids, including but not limited to, behind-the-ear (BTE), in-the-ear (ITE), in-the-canal (ITC), receiver-in-canal (RIC), invisible-in-canal (IIC) or completely-in-the-canal (CIC) type hearing aids. It is understood that behind-the-ear type hearing aids may include devices that reside substantially behind the ear or over the ear. Such devices may include hearing aids with receivers associated with the electronics portion of the behind-the-ear device, or hearing aids of the type having receivers in the ear canal of the user, including but not limited to receiver-in-canal (RIC) or receiver-in-the-ear (RITE) designs. The present subject matter can also be used in hearing assistance devices generally, such as cochlear implant type hearing devices and such as deep insertion devices having a transducer, such as a receiver or microphone, whether custom fitted, standard, open fitted or occlusive fitted. It is understood that other hearing assistance devices not expressly stated herein may be used in conjunction with the present subject matter.

This application is intended to cover adaptations or variations of the present subject matter. It is to be understood that the above description is intended to be illustrative, and not restrictive. The scope of the present subject matter should be determined with reference to the appended claims, along with the full scope of legal equivalents to which such claims are entitled.

What is claimed is:

1. A method, comprising:
providing a mobile adaptation tool for a wearer of a hearing assistance device, the mobile adaptation tool configured for wireless communication with the hearing assistance device, wherein the hearing assistance device is configured to sense sound signals and amplify the sound signals to compensate for hearing loss of the wearer;
using gamification, including using computer game thinking and game mechanics to engage and encourage the wearer to adjust settings of the hearing assistance device closer to predefined target settings using a processor of the mobile adaptation tool, including providing an update to the wearer via the adaptation tool with an indication of a level of matching between current settings and the target settings.

2. The method of claim 1, wherein using gamification to guide the wearer to adjust settings of the hearing assistance device includes using points as an incentive for the wearer.

3. The method of claim 1, wherein using gamification to guide the wearer to adjust settings of the hearing assistance device includes using a visual indicator to provide feedback to the wearer.

4. The method of claim 3, wherein using a visual indicator to provide feedback to the wearer includes using at least one of color coding, a smiley face, or stars that appear on a screen of the mobile adaptation tool.

5. The method of claim 1, wherein using gamification to guide the wearer to adjust settings of the hearing assistance device includes using a text to provide feedback to the wearer.

6. The method of claim 1, wherein using gamification to guide the wearer to adjust settings of the hearing assistance device includes using audio reinforcement to provide feedback to the wearer.

7. The method of claim 2, wherein using points as an incentive for the wearer includes using points that can be redeemed for tangible items.

8. The method of claim 1; wherein using gamification to guide the wearer to adjust settings of the hearing assistance device includes using a graphical user interface (GUI) on the adaptation to provide the update.

9. The method of claim 8, wherein using a GUI includes providing one or more of a table-like interface, equalizers (EQ) or a list of presets from which the wearer can select settings.

10. The method of claim 4, wherein using color coding includes using green to indicate a good match, yellow to indicate an okay match, and red to indicate a poor match for each of a plurality of frequency regions.

11. A system, comprising:
a heating assistance device configured to be worn by a wearer and further configured to sense sound signals and amplify the sound signals to compensate for hearing losses of the wearer; and
a mobile adaptation tool for the wearer, the mobile adaptation tool configured for wireless communication with the hearing assistance device and including a processor configured to use gamification, including using computer game thinking and game mechanics to engage and encourage the wearer to adjust settings of the hearing assistance device closer to predefined target settings using the mobile adaptation tool, including providing an update to the wearer via the adaptation tool with an indication of a level of matching between current settings and the target settings.

12. The system of claim 11, wherein the mobile adaptation tool includes a cellular telephone.

13. The system of claim 11, wherein the hearing assistance device includes a cochlear implant.

14. The system of claim 11, wherein the hearing assistance device includes a hearing aid.

15. The system of claim 14, wherein the hearing aid includes an in-the-ear (ITE) hearing aid.

16. The system of claim 14, wherein the hearing aid includes a behind-the-ear (BTE) hearing aid.

17. The system of claim 14, wherein the hearing aid includes an in-the-canal (ITC) hearing aid.

18. The system of claim 14, wherein the hearing aid includes a receiver-in-canal (RIC) hearing aid.

19. The system of claim 14, wherein the hearing aid includes a completely-in-the-canal (CIC) hearing aid.

20. The system of claim 14, wherein the hearing aid includes a receiver-in-the-ear (RITE) hearing aid.

* * * * *